US012526151B2

(12) United States Patent
Seo et al.

(10) Patent No.: US 12,526,151 B2
(45) Date of Patent: Jan. 13, 2026

(54) ELECTRONIC DEVICE AND METHOD FOR PREVENTING NON-FUNGIBLE TOKEN PLAGIARISM IN ELECTRONIC DEVICE

(71) Applicant: Samsung Electronics Co., Ltd., Suwon-si (KR)

(72) Inventors: Jaewoo Seo, Suwon-si (KR); Hyunwoo Kim, Suwon-si (KR); Seongwon Han, Suwon-si (KR); Jeongyoon Heo, Suwon-si (KR); Choonghoon Lee, Suwon-si (KR); Jungil Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 18/588,859

(22) Filed: Feb. 27, 2024

(65) Prior Publication Data

US 2024/0291665 A1 Aug. 29, 2024

Related U.S. Application Data

(63) Continuation of application No. PCT/KR2024/002454, filed on Feb. 26, 2024.

(30) Foreign Application Priority Data

Feb. 27, 2023 (KR) .................. 10-2023-0026139

(51) Int. Cl.
*H04L 29/06* (2006.01)
*G06F 21/16* (2013.01)
(Continued)

(52) U.S. Cl.
CPC ............ *H04L 9/3236* (2013.01); *G06F 21/16* (2013.01); *G06V 10/761* (2022.01)

(58) Field of Classification Search
CPC ......... H04L 9/3236; H04L 9/50; G06F 21/16; G06F 21/64; G06V 10/761; G06V 20/95
See application file for complete search history.

(56) References Cited

U.S. PATENT DOCUMENTS 6,185,316 B1 * 2/2001 Buffam ................ H04L 9/3231
382/125
9,026,615 B1 * 5/2015 Sirton .................. H04N 19/593
709/217
(Continued)

FOREIGN PATENT DOCUMENTS

CN 109543674 3/2019
JP 2019133496 A 8/2019
(Continued)

OTHER PUBLICATIONS

Search Report and Written Opinion dated Jun. 3, 2024 issued in International Patent Application No. PCT/KR2024/002454.

*Primary Examiner* — Mahfuzur Rahman
(74) *Attorney, Agent, or Firm* — Nixon & Vanderhye, P.C.

(57) ABSTRACT

According to an embodiment, an electronic device comprises: a communication circuit, at least one processor, and memory storing instructions. The electronic device may convert a first image into a latent vector using an encoder. The electronic device may obtain a first hash value by applying a hashing method to the latent vector for the first image. The electronic device may compare the first hash value for the first image with a second hash value for a second image; and determine whether the first image is plagiarized based on a result of the comparison.

20 Claims, 9 Drawing Sheets

(51) Int. Cl.
*G06V 10/74* (2022.01)
*H04L 9/32* (2006.01)

(56) References Cited

U.S. PATENT DOCUMENTS

| | | | |
|---|---|---|---|
| 9,092,520 B2* | 7/2015 | Yang | G06F 16/783 |
| 11,039,205 B2 | 6/2021 | Ye et al. | |
| 2019/0171665 A1 | 6/2019 | Navlakha et al. | |
| 2020/0099926 A1* | 3/2020 | Tanner | H04N 19/97 |
| 2020/0110519 A1* | 4/2020 | Vangala | G06F 3/0483 |
| 2020/0110623 A1* | 4/2020 | Vangala | G06F 3/0483 |
| 2021/0012813 A1 | 1/2021 | Farre Guiu et al. | |
| 2021/0044424 A1* | 2/2021 | Desprez | G06F 18/22 |
| 2022/0398538 A1 | 12/2022 | Jakobsson et al. | |
| 2024/0348603 A1* | 10/2024 | Tussy | G06V 40/167 |
| 2024/0380856 A1* | 11/2024 | Unuchek | G06F 21/32 |

FOREIGN PATENT DOCUMENTS

| | | |
|---|---|---|
| JP | 2022-551661 | 12/2022 |
| KR | 102009029 B1 | 8/2019 |
| KR | 20210063151 A | 6/2021 |
| KR | 102410669 B1 | 6/2022 |
| KR | 10-2022-0098503 | 7/2022 |

\* cited by examiner

ELECTRONIC DEVICE AND METHOD FOR PREVENTING NON-FUNGIBLE TOKEN PLAGIARISM IN ELECTRONIC DEVICE

CROSS-REFERENCE TO RELATED APPLICATIONS

This application is a continuation of International Application No. PCT/KR2024/002454 designating the United States, filed on Feb. 26, 2024, in the Korean Intellectual Property Receiving Office and claiming priority to Korean Patent Application No. 10-2023-0026139, filed on Feb. 27, 2023, in the Korean Intellectual Property Office, the disclosures of each of which are incorporated by reference herein in their entireties.

BACKGROUND

Field

The disclosure relates to a method for preventing plagiarism for non-fungible tokens (NFT) in an electronic device.

Description of Related Art

Blockchain is a technology for preventing data forgery based on distributed computing technology. By storing managed data in a distributed data storage environment called a "block," which is formed by connecting countless small pieces of data in a chain based on a peer-to-peer method, the technology makes it impossible for anyone to arbitrarily modify the data and allows anyone to view the results of the changes.

A block contains a record of all transactions that were propagated to users before the block was discovered, and it is sent to all users equally in a peer-to-peer manner, so transaction history cannot be modified or omitted. A block has a date of discovery and a link to the previous block, and the set of blocks is called a blockchain. Unlike traditional cryptocurrency transactions, which keep a record of transactions on a centralized server, blockchains make transactions visible to all users to be compared, thereby preventing forgery.

A non-fungible token (NFT) is a virtual token that uses blockchain technology to prove ownership of a digital asset. An address that points to a digital file (e.g., a picture or video) may be embedded within the token and used to represent its unique originality and ownership. NFTs are unique and may not be duplicated. NFTs may be guaranteed to be unique by leaving a permanent record of their transactions on the blockchain.

NFTs act like crypto tokens, but unlike cryptocurrencies such as Bitcoin, they are not interchangeable. The encryption transaction process of NFTs ensures the authentication of each digital file by providing a digital signature that is used to track NFT ownership.

SUMMARY

According to an embodiment, an electronic device comprises: a communication circuit and at least one processor, comprising processing circuitry, connected to the communication circuit. At least one processor may be configured to: convert a first image into a latent vector using an encoder. At least one processor may obtain a first hash value by applying a hashing method to the latent vector for the first image. At least one processor may compare the first hash value for the first image with a second hash value for a second image; and determine whether the first image is plagiarized based on a result of the comparison.

According to an embodiment, a method of operating an electronic device may comprise: converting a first image into a latent vector using an encoder. The method for operating the electronic device may comprise obtaining a first hash value by applying a hashing method to the latent vector for the first image. The method for operating the electronic device may comprise comparing the first hash value for the first image with a second hash value for a second image; and determining whether the first image is plagiarized based on a result of the comparison.

According to an embodiment, there may be provided a non-transitory computer-readable storage medium storing at least one instruction. The at least one instruction may, when executed by at least one processor, individually and/or collectively, cause an electronic device to perform a plurality of operations. The plurality of operations may comprise: converting a first image into a latent vector using an encoder. The plurality of operations may comprise obtaining a first hash value by applying a hashing method to the latent vector for the first image. The plurality of operations may comprise comparing the first hash value for the first image with a second hash value for a second image and determining whether the first image is plagiarized based on a result of the comparison.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
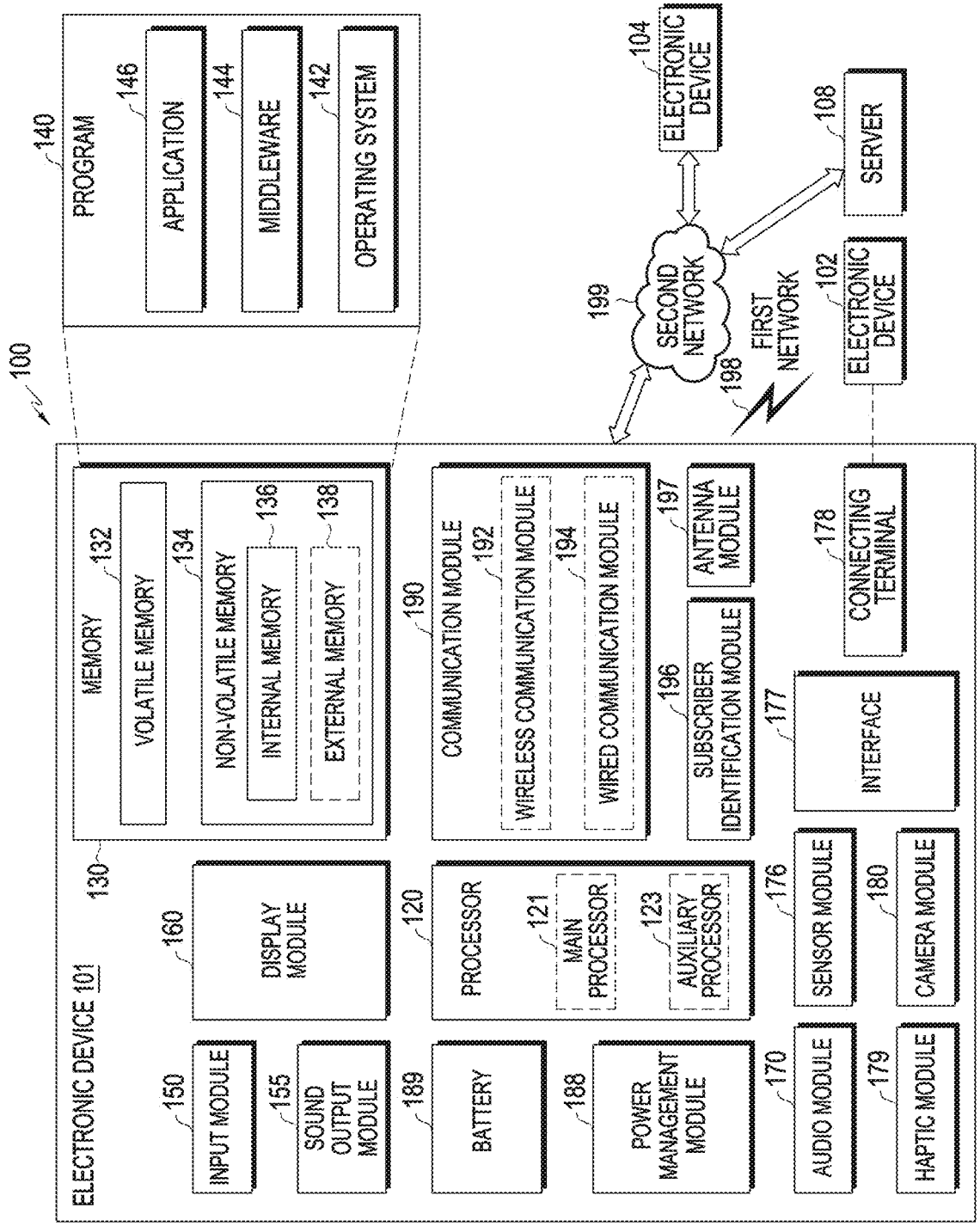
FIG. 1 is a block diagram illustrating an example electronic device in a network environment according to an embodiment.

Hereinafter, an embodiment of the disclosure is described with reference to the accompanying drawings. When determined to make the subject matter of an embodiment of the disclosure unclear, the detailed description of the relevant known art or functions may be skipped. The terms described below are defined considering the functions in embodiments of the present disclosure and may be replaced with other terms according to the intention or practice of the user or operator. Therefore, the terms should be defined based on the overall disclosure.

The terms as used herein are provided merely to describe some embodiments thereof, but not to limit an embodiment of the disclosure. The terms as used herein are provided merely to describe some embodiments thereof, but not to limit the scope of other embodiments of the present disclosure. Unless otherwise defined, all terms including technical and scientific terms used herein have the same meaning as commonly understood by one of ordinary skill in the art to which the embodiments of the disclosure pertain and should not be interpreted as overly broad or narrow. As used herein, terms wrong or inappropriate for representing the spirit of the disclosure may be replaced with and understood as more proper ones to represent the spirit of the disclosure by one of ordinary skill in the art. General terms as used herein should be interpreted in the context of the disclosure or as defined in dictionaries.

As used herein, the singular forms "a," "an," and "the" are intended to include the plural forms as well, unless the context clearly indicates otherwise. As used herein, the term "comprise" or "include" should not be interpreted as necessarily including all of several components or operations set forth herein but should rather be interpreted as omitting some components or operations or adding more components or operations.

As used herein, the terms "first" and "second" may be used to describe various components, but the components should not be limited by the terms. The terms are used simply to distinguish one component from another. For example, a first component may be denoted a second component, and vice versa without departing from the scope of the present disclosure.

It will be understood that when an element or layer is referred to as being "on," "connected to," "coupled to," or "adjacent to" another element or layer, it can be directly on, connected, coupled, or adjacent to the other element or layer, or intervening elements or layers may be present. When a component is "directly connected to" or "directly coupled to" another component, no other intervening components may intervene therebetween.

Hereinafter, an embodiment of the disclosure will be described in detail with reference to the accompanying drawings. The same reference denotations may be used to refer to the same or substantially the same elements throughout the disclosure and the drawings. No duplicate description of the same elements is given herein. When determined to make the subject matter of an embodiment of the disclosure unclear, the detailed description of the known art or functions may be skipped. The accompanying drawings are provided for an easier understanding of the spirit of the disclosure but the disclosure should not be limited thereby. It should be interpreted that the spirit of the disclosure may encompasses all other changes, equivalents, or replacements of those shown in the drawings.

FIG. 1 is a block diagram illustrating an example electronic device in a network environment according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. According to an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store a piece of data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module

194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support a requirement specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment of the disclosure may be a type of device. The electronic devices may include, e.g., a portable communication device (e.g., a smartphone), a computer device, a portable multimedia device, a portable medical device, a camera, a wearable device, a home appliance, a wireless earphone, ear buds, or the like. The electronic devices according to an embodiment are not limited to those described above.

An embodiment of the disclosure and terms used therein are not intended to limit the technical features described in the disclosure to specific embodiments, and should be understood to include a modification, equivalent, or substitute of an embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or Further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Blockchain may refer, for example, to a technology for preventing data forgery based on distributed computing technology. By storing managed data in a distributed data storage environment called a "block," which is formed by connecting countless small pieces of data in a chain based on a peer-to-peer method, the technology makes it impossible for anyone to arbitrarily modify the data and allows anyone to view the results of the changes.

A non-fungible token (NFT) may refer, for example, to a virtual token that uses blockchain technology to prove ownership of a digital asset. NFTs act like crypto tokens, but unlike cryptocurrencies such as Bitcoin, they are not interchangeable. The encryption transaction process of NFTs ensures the authentication of each digital file by providing a digital signature that is used to track NFT ownership.

The NFT includes a token issued to have a unique value for each object and is one of the blockchain technologies that may be mainly applied to game items or works of art. Meanwhile, a need arises for a means to prevent plagiarism or counterfeiting of data from digital art created in the form of an NFT.

NFT transaction platforms that broker NFT transactions between users may not have specific policies for managing artwork, and require a means to prevent plagiarism or counterfeiting of artwork created in the form of NFTs. A need also arises for technology for determining plagiarism when registering NFTs on the NFT transaction platform.

Figure 2:
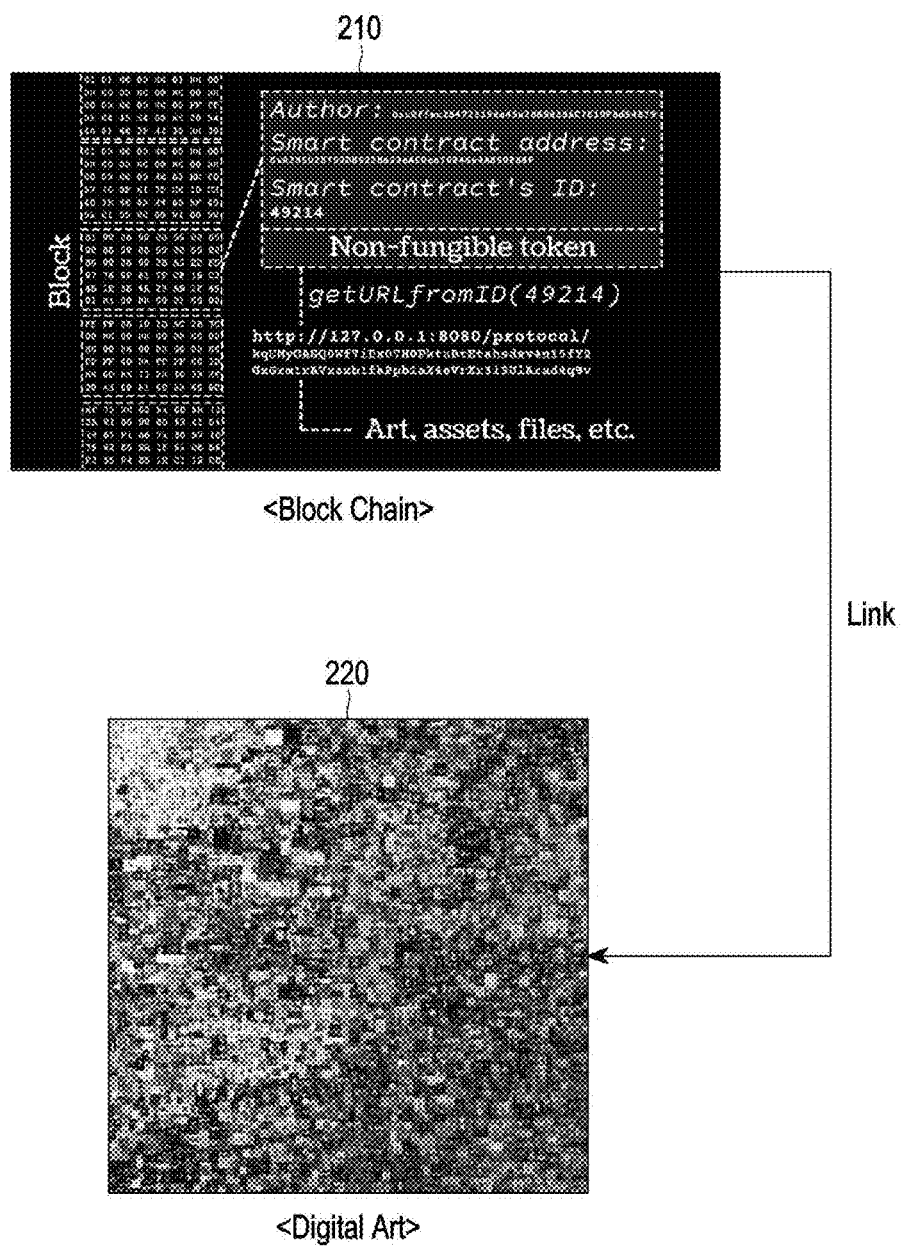
FIG. 2 is a diagram illustrating an example NFT using a blockchain according to an embodiment of the disclosure.

FIG. 2 is a diagram illustrating an example NFT using a blockchain according to an embodiment of the disclosure.

Referring to FIG. 2, the blockchain 210 may include a digital artwork 220 implemented in an NFT form. It may be identified whether the digital artwork 220 implemented in the form of a registered NFT is plagiarized or counterfeited on the NFT transaction platform that brokers the transaction of the digital artwork 220.

If the NFT transaction platform identifies whether the digital artwork 220 is plagiarized or counterfeited by comparing it to all original works every time the NFT is issued, the NFT issuance (or registration) of the digital artwork 220 may be delayed. When comparing the digital artwork 220 and other digital artworks on the NFT transaction platform, a mere partial change (in, e.g., color or size) may lead to them being recognized as different artworks.

The disclosure provides a method in which when an electronic device (e.g., the electronic device 101 of FIG. 1) implements the digital artwork 220 in the form of an NFT, an image of the digital artwork 220 is vectorized, the vector is hashed according to the result of the vectorization, and a hashing result value is added, issuing an NFT.

According to an embodiment, the electronic device may encode the image of the digital artwork 220 using a pre-trained encoder (e.g., an auto encoder) and convert the same into a latent vector. According to an embodiment, the latent vector may be referred to as a latent variable, code, or feature.

According to an embodiment, the auto encoder may compress the input data and extract meaningful data as the latent vector during the compression process. According to an embodiment, the auto encoder may automatically extract data as a latent vector for the image in response to a command to compress the data in preset dimensions (e.g., two or three dimensions). According to an embodiment, the auto encoder may compress a feature of the original data in low dimensions. According to an embodiment, the auto encoder may perform dimensional reduction, data compression, data noise removal, and/or error value detection on the original data.

According to an embodiment, the electronic device may calculate a hash value by applying a hashing method to the vectorized image (e.g., a converted black-and-white image) of the digital artwork 220. According to an embodiment, the electronic device may divide the vectorized image (e.g., a converted black-and-white image) for the digital artwork 220 into clusters, and may calculate the hash value by applying hashing (or locality sensitive hashing (LSH)) capable of calculating a similarity between data. For example, the hashing method capable of calculating a similarity between data may be implemented as Nilsimsa Hash.

According to an embodiment, the electronic device may additionally include hashing (or LSH) capable of calculating a similarity between data and may issue an NFT for the digital artwork 220.

In the disclosure, when the electronic device implements the digital artwork 220 in an NFT form, plagiarism for the digital artwork 220 may be efficiently inspected. According to an embodiment, for an NFT plagiarism inspection, the electronic device may convert the digital artwork 220 into a latent vector using an encoder (e.g., an auto encoder), calculate an LSH for the latent vector, and may compare the digital artwork 220 with another original work when a similarity according to a result of the calculation is equal to or greater than a threshold.

Figure 3:
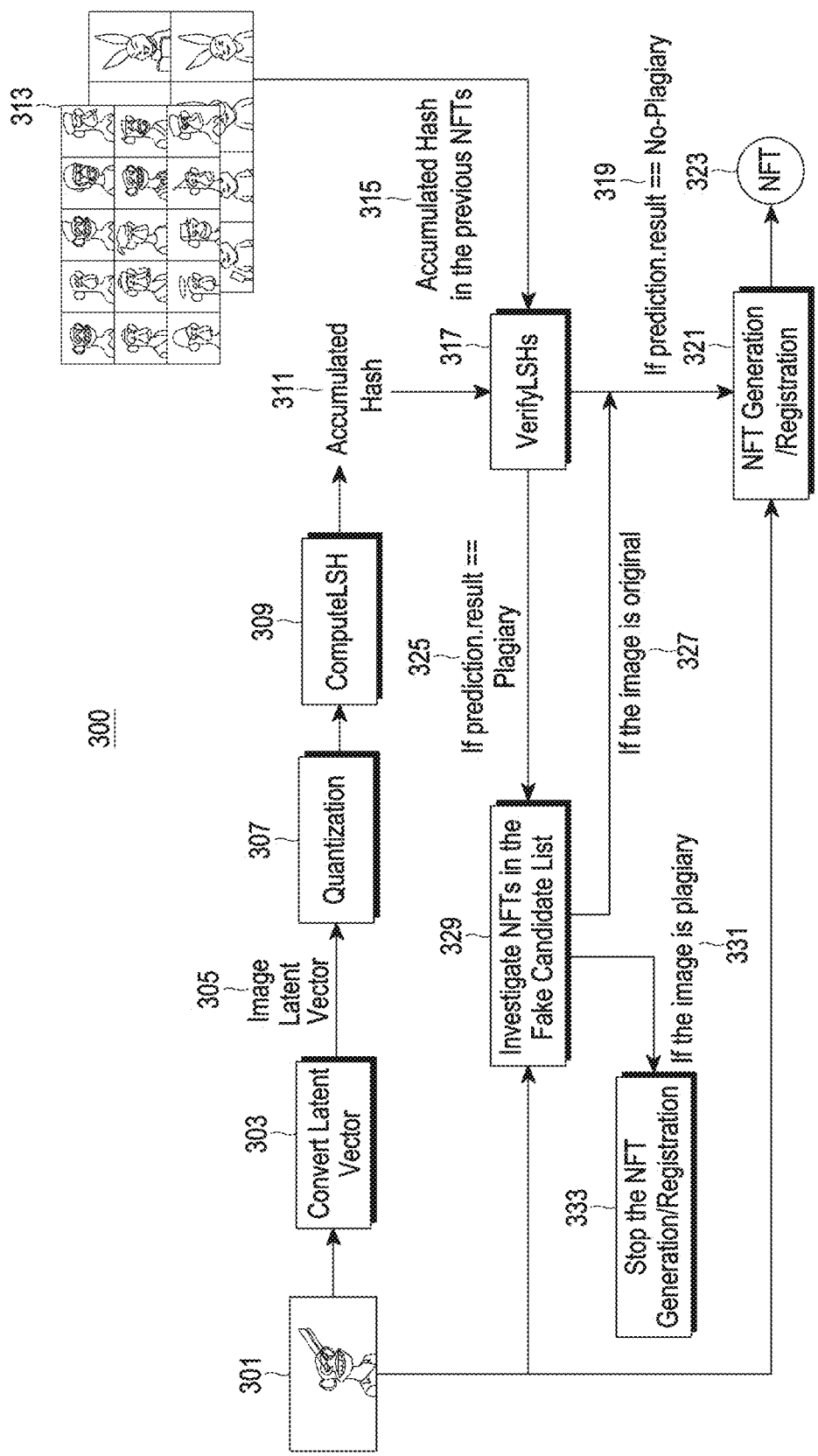
FIG. 3 is a diagram illustrating example operations of an electronic device for issuing an NFT according to an embodiment of the disclosure.

FIG. 3 is a diagram illustrating example operations of an electronic device for issuing an NFT according to an embodiment of the disclosure.

Referring to FIG. 3, the electronic device 300 may receive an image 301 and may extract an image latent vector 305 for the image 301 using a latent vector conversion module (ConvertLatent Vector) 303. According to an embodiment, the latent vector conversion module 303 may be implemented as an encoder.

The electronic device 300 may perform quantization 307 on the latent vector 305 of the image 301. The electronic device 300 may divide the converted image into clusters based on quantization 307 for the latent vector 305. The electronic device 300 may calculate (309) locality sensitive hashing (LSH) for calculating a similarity between data after quantization 307 on the latent vector 305. The electronic device 300 may calculate an accumulated hash value 311 for the image 301 after applying the LSH.

The electronic device 300 may calculate the accumulated hash value 315 from previous NFTs (or other NFTs) corresponding to the previous images (or other images) 313. The electronic device 300 may determine (VerifyLSH) (317) the similarity between the two based on the accumulated hash value 311 for the image 301 and the accumulated hash value 315 for the previous images 313. The electronic device 300 may determine whether the image 301 plagiarizes at least one of the previous images 313, based on the similarity determination (VerifyLSH) 317 between the accumulated hash value 311 for the image 301 and the accumulated hash value 315 for the previous images 313.

If the electronic device 300 predicts (319) that the image 301 does not plagiarize at least one of the previous images 313 based on the similarity determination (VerifyLSH) 317 between the accumulated hash value 311 and the accumulated hash value 315, the electronic device 300 may perform (321) an NFT generation and/or registration procedure for the image 301, generating an NFT 323 for the image 301. According to an embodiment, when the NFT 323 is issued, the electronic device 300 may insert the accumulated hash value 311 into the NFT 323.

If the electronic device 300 predicts (325) that the image 301 plagiarizes at least one of the previous images 313 based on the similarity determination (VerifyLSH) 317 between the accumulated hash value 311 and the accumulated hash value 315, the electronic device 300 may investigate (329) NFTs in the fake candidate list. If the electronic device 300 determines (331) that the image 301 is a plagiary, the electronic device 300 may stop (333) generating or registering the NFT for the image 301. If the electronic device 300 determines (327) that the image 301 is the original, the electronic device 300 may perform (321) an NFT generation and/or registration procedure on the image 301, generating an NFT 323 for the image 301. According to an embodiment, when the NFT 323 is issued, the electronic device 300 may insert the accumulated hash value 311 into the NFT 323.

Figure 4A:
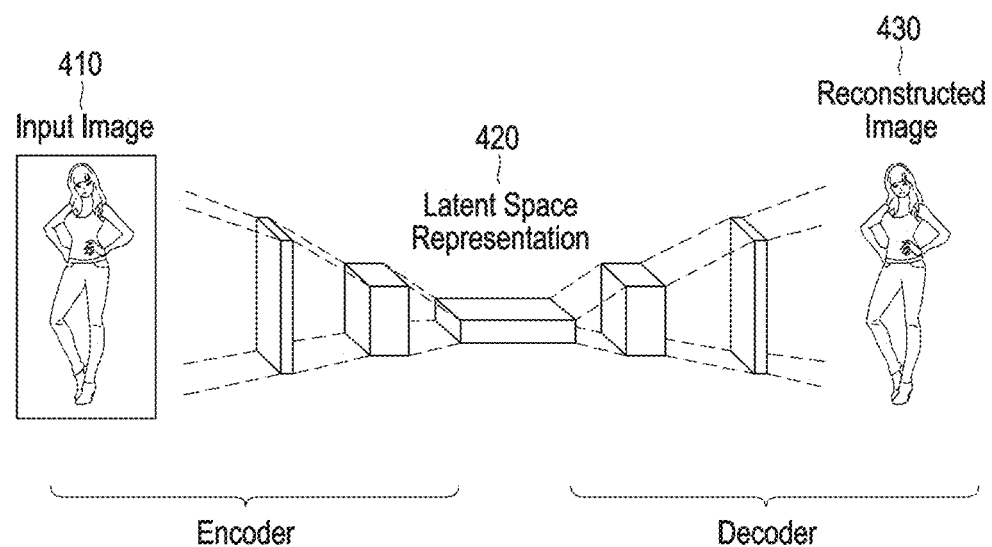
FIGS. 4A and 4B are diagrams illustrating vectorization for an image according to an embodiment of the disclosure.
Figure 4B:
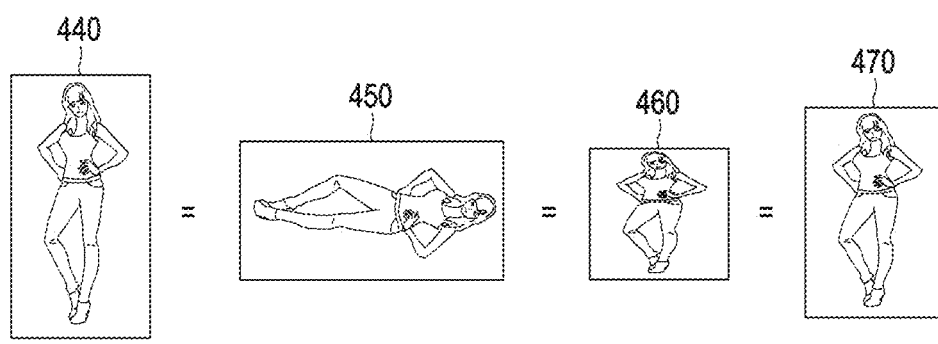

FIGS. 4A and 4B are diagrams illustrating example vectorization for an image according to an embodiment of the disclosure.

Referring to FIG. 4A, an electronic device (e.g., the electronic device 101 of FIG. 1) may convert (or project) an input image 410 into a latent vector that is a latent space representation 420 using an auto encoder to alleviate sensitivity to digital data change.

The auto encoder may include a unique structure of a data set by projecting each instance to the latent space where similar objects/images tend to be close to each other, as an example of one unsupervised learning method.

The auto encoder may comprise three parts: an encoder, a latent vector, and a decoder. According to an embodiment, the input image 410 may be projected into the latent space by encoding a layer of a network that generates a latent vector of lower dimensions than the original image. According to an embodiment, the latent vector may be used by the decoder (or the decoding layer of the network) to generate a reconstructed image 430 obtained by reconstructing the input image 410. The auto encoder may minimize and/or reduce a loss between the input image 410 and the reconstructed image 430.

According to an embodiment, the electronic device may learn a similar image (e.g., a profile image or a game character) used as an NFT using the auto encoder.

Referring to FIG. 4B, the original image 440 may be changed (e.g., rotated, resized, recolored, or distorted), implementing a first image 450, a second image 460, or a third image 470.

By the nature of digital data, a mere change (e.g., rotation, resizing, recoloring, or distortion) to the original may lead to the digital data being recognized as completely different works. However, the electronic device may recognize the original and the changed work as the same work as they are located in similar vector spaces despite a partial change to the original using the auto encoder.

The electronic device may recognize that the first image 450, the second image 460, or the third image 470 is the same as the original image 440 using the auto encoder.

Figure 5:
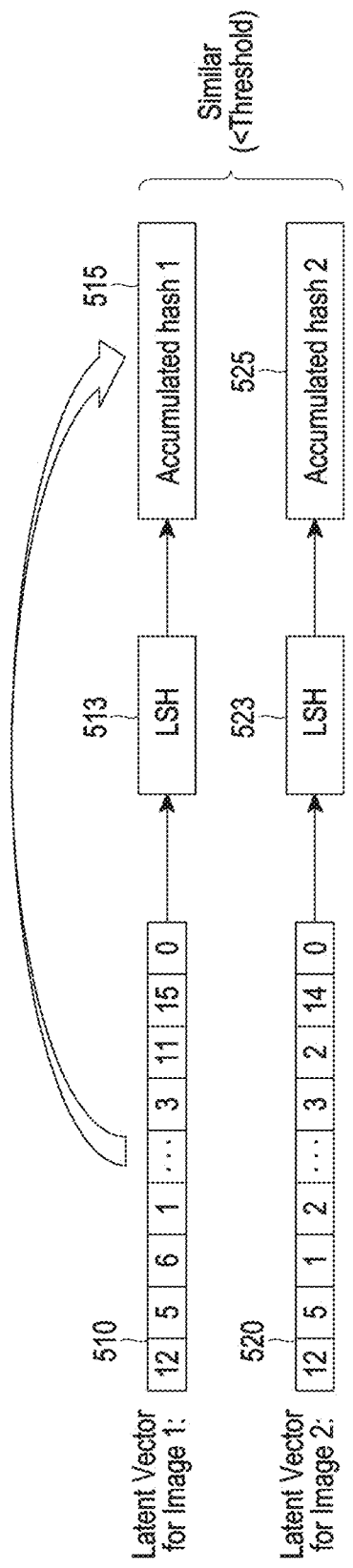
FIG. 5 is a diagram illustrating hashing for a vector according to an embodiment of the disclosure.

FIG. 5 is a diagram illustrating example hashing for a vector according to an embodiment of the disclosure.

Referring to FIG. 5, an electronic device (e.g., the electronic device 101 of FIG. 1) may calculate a first accumulated hash value (accumulated hash 1) 515 by applying a locality sensitive hashing (LSH) 513 to a latent vector 510 for a first image. The electronic device may calculate a second accumulated hash value 525 by applying an LSH 523 to the latent vector 520 for a second image. For example, the latent vector 510 for the first image may include {12, 5, 6, 1, . . . , 3, 11, 15, 0}. For example, the latent vector 520 for the second image may include {12, 5, 1, 2, . . . , 3, 2, 14, 0}.

The electronic device may determine a similarity between the first accumulated hash value 515 and the second accumulated hash value 525. According to an embodiment, the electronic device may compare the similarity between the first accumulated hash value 515 and the second accumulated hash value 525 with a threshold and may determine whether the first image and the second image are similar (or the same) images according to the comparison result.

According to an embodiment, when the similarity between the first accumulated hash value 515 and the second accumulated hash value 525 is greater than the threshold, the electronic device may determine that the first image and the second image are similar (or the same) images.

Due to a difference in features (e.g., eye color, hair shape, etc.) between similar images, the distance in the dimensions for the latent vector representing the feature may be increased. According to an embodiment, when a difference occurs only in a specific feature domain in the latent space, it is necessary to mitigate the difference. Efficient comparison for latent vectors is required to minimize and/or reduce delays in NFT registration on the NFT transaction platform. The disclosure may increase the speed of comparison between images implemented as NFTs and insensitive to changes in some features using LSH.

Figure 6:
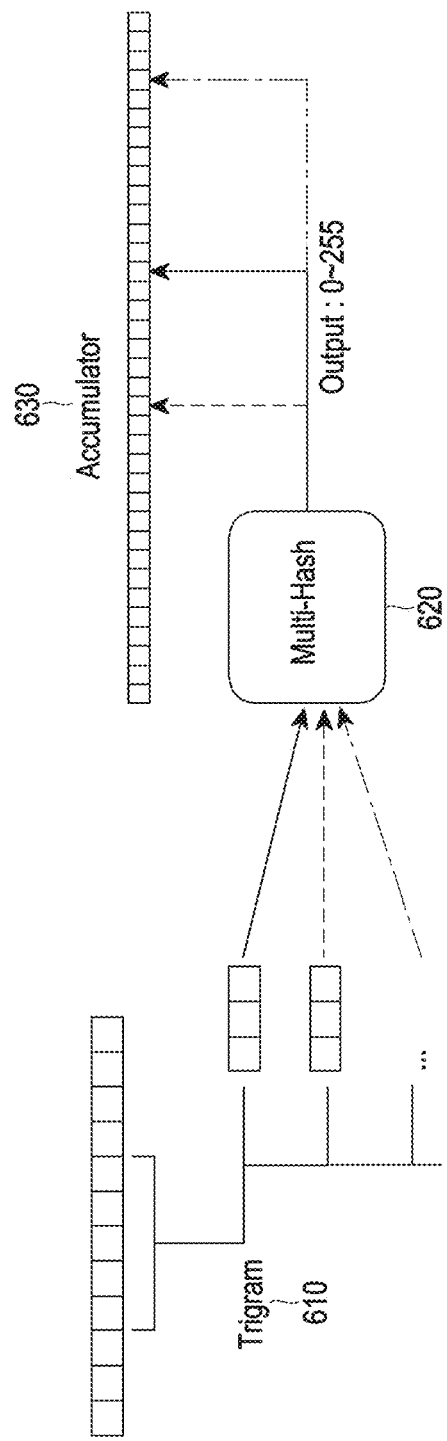
FIG. 6 is a diagram illustrating an example of Nilsimsa hash according to an embodiment of the disclosure.

FIG. 6 is a diagram illustrating an example of Nilsimsa hash according to an embodiment of the disclosure.

The LSH of FIG. 5 may be implemented as the Nilsimsa hash shown in FIG. 6. Nilsimsa hash may refer, for example, to an LSH algorithm-based string similarity measurement algorithm (e.g., used to detect spam phrases). According to an embodiment, the similarity between images may be determined through different bits of the Nilsimsa hash.

Referring to FIG. 6, the electronic device may generate a sub-string Trigram 610 in a window slide manner for an input character string. The electronic device may calculate the hash of the Trigram 610 using a multi-hash 620 having an output value of 0 to 255.

When the hash of the Trigram 610 is n, the electronic device may increase the nth value of the accumulator 630 (array having a length of 256) by 1. If each element of the accumulator 630 is greater than or equal to a threshold, the electronic device may return 1, and if each element of the accumulator 630 is less than the threshold, the electronic device may return 0, generating a hash of 256 bits.

Figure 7:
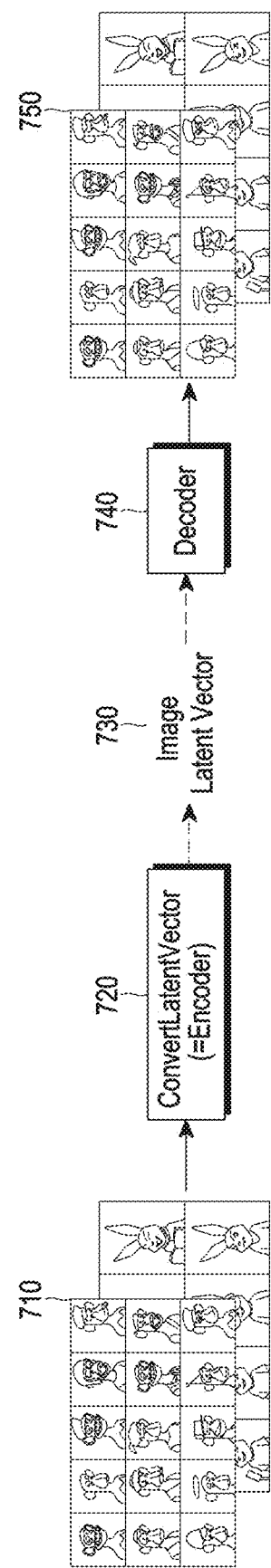
FIG. 7 is a diagram illustrating an example process for converting an image into a latent vector according to an embodiment of the disclosure.

FIG. 7 is a diagram illustrating an example process for converting an image into a latent vector according to an embodiment of the disclosure.

Referring to FIG. 7, the electronic device may receive the first image 710 and may convert the first image 710 into an image latent vector 730 using a latent vector conversion module (ConvertLatent Vector) 720. According to an embodiment, the latent vector conversion module 720 may include various circuitry and/or executable program instructions and be referred to as an encoder or an auto encoder. According to an embodiment, the latent vector conversion module 720 may be implemented by various techniques capable of projecting the first image 710 to the image latent vector 730.

According to an embodiment, the latent vector conversion module 720 may train an auto encoder network using an image (e.g., a profile image) issued as an NFT. According to an embodiment, the electronic device may use only the pre-trained latent vector conversion module 720 to convert the first image 710 into the image latent vector 730. According to an embodiment, the electronic device may derive the second image 750 from the image latent vector 730 using the decoder 740.

Figure 8:
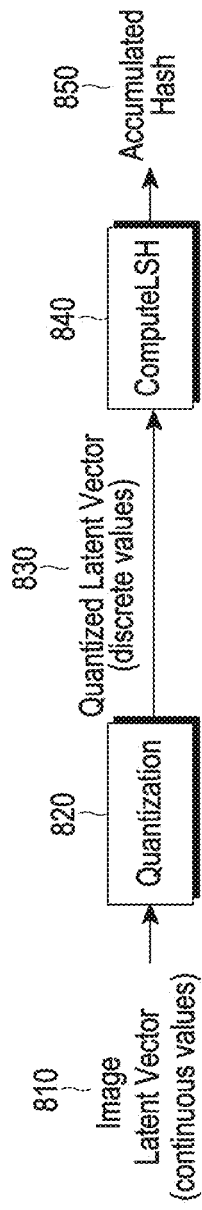
FIG. 8 is a diagram illustrating an example process for outputting a hash value based on a latent vector according to an embodiment of the disclosure.

FIG. 8 is a diagram illustrating an example process for outputting a hash value based on a latent vector according to an embodiment of the disclosure.

Referring to FIG. 8, the electronic device may perform quantization 820 on an image latent vector 810 having continuous values, and may obtain a quantized latent vector 830 having discrete values based on a result of the quantization 820. The electronic device may perform LSH calculation (ComputeLSH) 840 on the quantized latent vector 830 and may obtain an accumulated hash value 850 based on the result of the LSH calculation 840.

Quantization 820 may refer, for example, to converting continuous values into discrete values (e.g., [375, 645]→ [300, 600]). According to an embodiment, the section (or unit) for quantization 820 may be applied in units of the minimum section in which a change occurs in the output image of the decoder due to a change in a feature in the trained encoder.

According to an embodiment, the content used to generate the NFT may be implemented as a character image, at least 128 features may be used to represent the character image, and the encoder may output an output value of at least 128-dimensions. For example, when 90% or more of the features are the same (115 or more of 128 features), the images may be predicted as the same image.

According to an embodiment, assuming that inconsistent features are uniformly distributed in the quantized latent vector 830, e.g., Nilsimsa Hash having a 256-bit output value for content having the same features by 90% or more may have the same value in more places than 217 bits (13×3). (Threshold(0.9)=0.848) According to an embodiment, the electronic device using the Nilsimsa hash may set a threshold (Threshold(P)) for determining NFT plagiarism as shown in Equation 1.

$$\text{Threshold}(P) = 1 - (\text{Ceiling}(\text{Dim}(\text{LatentVector}) \times (1 - P)) \times \text{WindowSize})/\text{Len}(\text{Nilsimsa}) \quad \text{[Equation 1]}$$

Here, Dim(LatentVector) may refer to the number of dimensions of the latent vector (e.g., 128), P is a probability for determining content similarity (0≤ P≤1) (e.g., 0.9), Ceiling( ) is a rounding function (e.g., expressing to, up to, ones place), WindowSize is the number of dimensions of the latent vector entering as an input of the hash function in Nilsimsa (e.g., 3), and Len(Nilsimsa) is the length of the Nilsimsa output value (e.g., 256).

Figure 9:
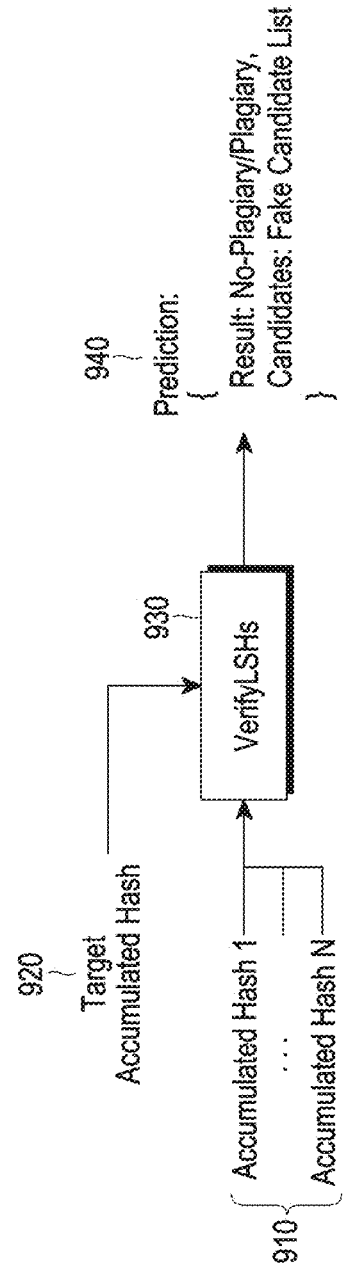
FIG. 9 is a diagram illustrating an example process for determining a similarity of NFTs based on a plurality of hash values according to an embodiment of the disclosure.

FIG. 9 is a diagram illustrating an example process for determining a similarity of NFTs based on a plurality of hash values according to an embodiment of the disclosure.

Referring to FIG. 9, the electronic device may determine whether the target image plagiarizes at least one of a plurality of images based on the similarity determination (VerifyLSH) 930 for a plurality of accumulated hash values (accumulated hash 1 to accumulated hash N) 910 respectively corresponding to the plurality of images and a target hash value 920 corresponding to the target image.

The electronic device may predict whether the target image plagiarizes at least one of the plurality of images based on the similarity determination (VerifyLSH) 930, and may record the prediction result 940. According to an embodiment, the electronic device may generate or output a list (fake candidate list) of images having a similarity to the target image, which is a threshold or more.

Figure 10:
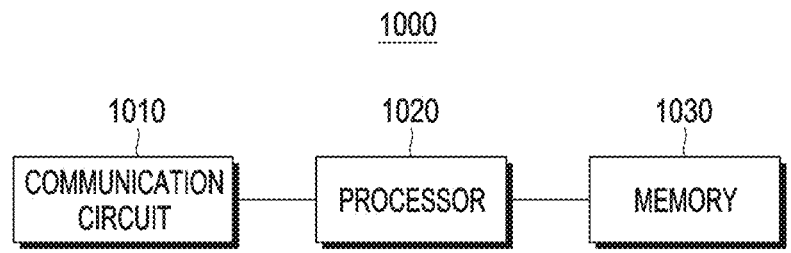
FIG. 10 is a block diagram illustrating an example configuration of an electronic device according to an embodiment of the disclosure.

FIG. 10 is a block diagram illustrating an example configuration of an electronic device according to an embodiment of the disclosure.

The electronic device 1000 of FIG. 10 may be implemented as any one of the electronic devices described above with reference to FIGS. 1 to 9.

Referring to FIG. 10, the electronic device 1000 may include a communication circuit 1010, a processor (e.g., including processing circuitry) 1020, and memory 1030. In the disclosure, the processor 1020 may include a circuit or application-specific integrated circuit or at least one processor. The processor 1020 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The communication circuit 1010 may transmit and receive signals to and from other electronic devices, and may also be referred to as a transceiver.

The processor 1020 may control an overall operation of the electronic device 1000 according to an embodiment provided in the disclosure, and may also be referred to as a controller. For example, the processor 1020 may control the operation of the electronic device described with reference to FIGS. 1 to 9.

According to an embodiment, the processor 1020 may convert a first image into a latent vector using an encoder. The at least one processor may convert a first image into a latent vector using an encoder. According to an embodiment, the processor 1020 may obtain a first hash value by applying a hashing method to the latent vector for the first image. According to an embodiment, the processor 1020 may compare the first hash value for the first image with a second hash value for a second image and determine whether the first image is plagiarized according to a result of the comparison. According to an embodiment, the hashing method may be locality sensitive hashing (LSH). According to an embodiment, upon determining that the first image does not plagiarize other images, the processor 1020 may generate a non-fungible token (NFT) for the first image including the first hash value.

According to an embodiment, the processor 1020 may perform quantization on the latent vector of the first image and apply the hashing method to the quantized latent vector. According to an embodiment, a section for the quantization may be set as a minimum section where a change in an image output from a decoder occurs due to a change in a feature for the first image in the encoder. According to an embodiment, the number of dimensions of the latent vector generated using the encoder may be 128 or more.

According to an embodiment, the processor 1020 may determine whether a similarity between the first hash value for the first image and the second hash value for the second image is a threshold or more. According to an embodiment, when the similarity is the threshold or more, the processor 1020 may identify whether the first image plagiarizes the second image. According to an embodiment, the processor 1020 may generate a list including at least one image having a similarity to the first image, which is the threshold or more.

Figure 11:
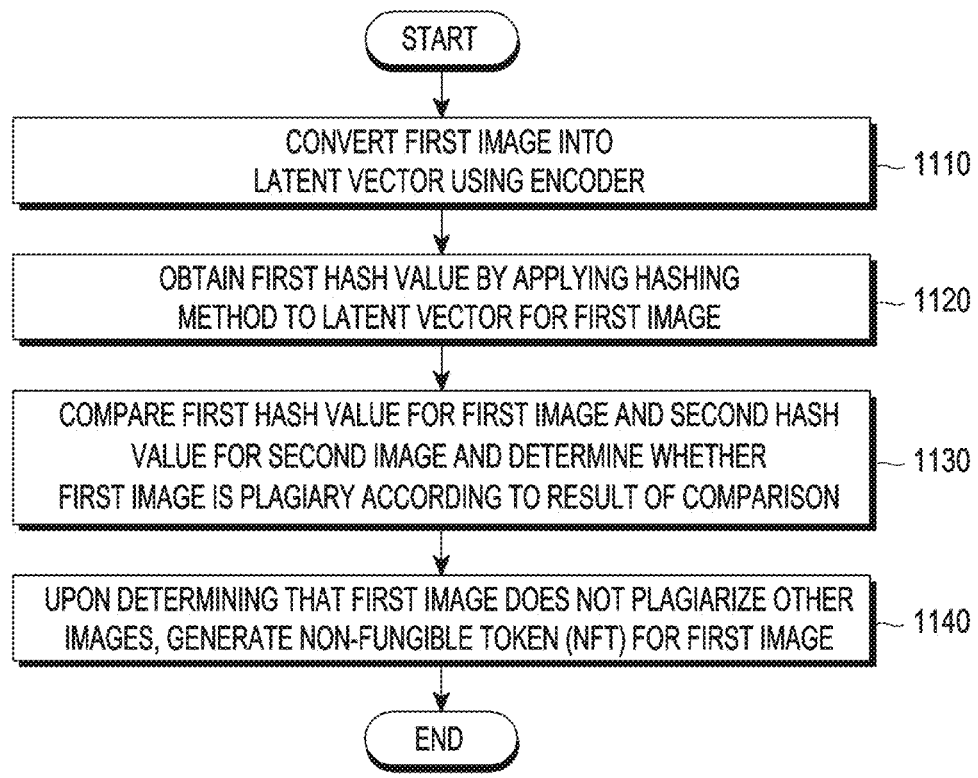
FIG. 11 is a flowchart illustrating example operations of an electronic device according to an embodiment of the disclosure.

FIG. 11 is a flowchart illustrating example operations of an electronic device according to an embodiment of the disclosure.

The electronic device of FIG. 11 may be implemented as the electronic device 101 of FIG. 1 or the electronic device 1000 of FIG. 10.

Referring to FIG. 11, in operation 1110, the electronic device may convert a first image into a latent vector using an encoder. In operation 1120, the electronic device may obtain a first hash value by applying a hashing method to the latent vector for the first image. In operation 1130, the electronic device may compare the first hash value for the first image with a second hash value for a second image and determine whether the first image is plagiarized according to a result of the comparison. In operation 1140, upon determining that the first image does not plagiarize other images, the electronic device may generate a non-fungible token (NFT) for the first image including the first hash value.

According to an embodiment, in a non-transitory computer-readable storage medium storing at least one instruction, the at least one instruction may, when executed by at least one processor (120 of FIG. 1; 1020 of FIG. 10), cause an electronic device (101 of FIG. 1; 1000 of FIG. 10) to perform a plurality of operations. The plurality of operations may comprise: converting a first image into a latent vector using an encoder. The plurality of operations may comprise obtaining a first hash value by applying a hashing method to the latent vector for the first image. The plurality of operations may comprise comparing the first hash value for the first image with a second hash value for a second image and determining whether the first image is plagiarized according to a result of the comparison.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a communication circuit;
   at least one processor, comprising processing circuitry; and memory storing instructions for execution by at least one processor, wherein at least one processor, individually and/or collectively, is configured to cause the electronic device to:

convert a first image into a latent vector using an encoder;

obtain a first hash value by applying a hashing method to the latent vector for the first image; and compare the first hash value for the first image with a second hash value for a second image and determine whether the first image is plagiarized based on a result of the comparison.

2. The electronic device of claim 1, wherein the electronic device is configured to:

based on determining that the first image does not plagiarize other images, generate a non-fungible token (NFT) for the first image including the first hash value.

3. The electronic device of claim 1, wherein the hashing method includes locality sensitive hashing (LSH).

4. The electronic device of claim 1, wherein the electronic device is configured to:

perform quantization on the latent vector of the first image; and apply the hashing method to the quantized latent vector.

5. The electronic device of claim 1, wherein the electronic device is configured to set as a section for the quantization a minimum section where a change in an image output from a decoder occurs due to a change in a feature for the first image in the encoder.

6. The electronic device of claim 1, wherein a number of dimensions of the latent vector generated using the encoder is 128 or more.

7. The electronic device of claim 1, wherein the electronic device is configured to:

determine whether a similarity between the first hash value for the first image and the second hash value for the second image is a threshold or more; and based on the similarity being the threshold or more, identify whether the first image plagiarizes the second image.

8. The electronic device of claim 1, wherein the electronic device is configured to generate a list including at least one image having a similarity to the first image, having the threshold or more.

9. A method of operating an electronic device, comprising:

converting a first image into a latent vector using an encoder;

obtaining a first hash value by applying a hashing method to the latent vector for the first image; and comparing the first hash value for the first image with a second hash value for a second image and determining whether the first image is plagiarized based on a result of the comparison.

10. The method of claim 9, further comprising, based on determining that the first image does not plagiarize other images, generating a non-fungible token (NFT) for the first image including the first hash value.

11. The method of claim 9, wherein the hashing method includes locality sensitive hashing (LSH).

12. The method of claim 9, further comprising:

performing quantization on the latent vector of the first image; and applying the hashing method to the quantized latent vector.

13. The method of claim 9, wherein a section for the quantization is set as a minimum section where a change in an image output from a decoder occurs due to a change in a feature for the first image in the encoder.

14. The method of claim 9, wherein a number of dimensions of the latent vector generated using the encoder is 128 or more.

15. The method of claim 9, further comprising:

determining whether a similarity between the first hash value for the first image and the second hash value for the second image is a threshold or more; and based on the similarity being the threshold or more, identifying whether the first image plagiarizes the second image.

16. The method of claim 9, further comprising generating a list including at least one image having a similarity to the first image, having the threshold or more.

17. A non-transitory computer-readable storage medium storing at least one instruction, wherein the at least one instruction, when executed by at least one processor, comprising processing circuitry, individually and/or collectively, cause an electronic device to perform operations, comprising:

converting a first image into a latent vector using an encoder;

obtaining a first hash value by applying a hashing method to the latent vector for the first image; and comparing the first hash value for the first image with a second hash value for a second image and determining whether the first image is plagiarized based on a result of the comparison.

18. The non-transitory computer-readable storage medium of claim 17, wherein the plurality of operations further comprise, based on determining that the first image does not plagiarize other images, generating a non-fungible token (NFT) for the first image including the first hash value.

19. The non-transitory computer-readable storage medium of claim 17, wherein the hashing method includes locality sensitive hashing (LSH).

20. The non-transitory computer-readable storage medium of claim 17, wherein the plurality of operations further comprise:

performing quantization on the latent vector of the first image; and applying the hashing method to the quantized latent vector.

* * * * *